UNITED STATES PATENT OFFICE.

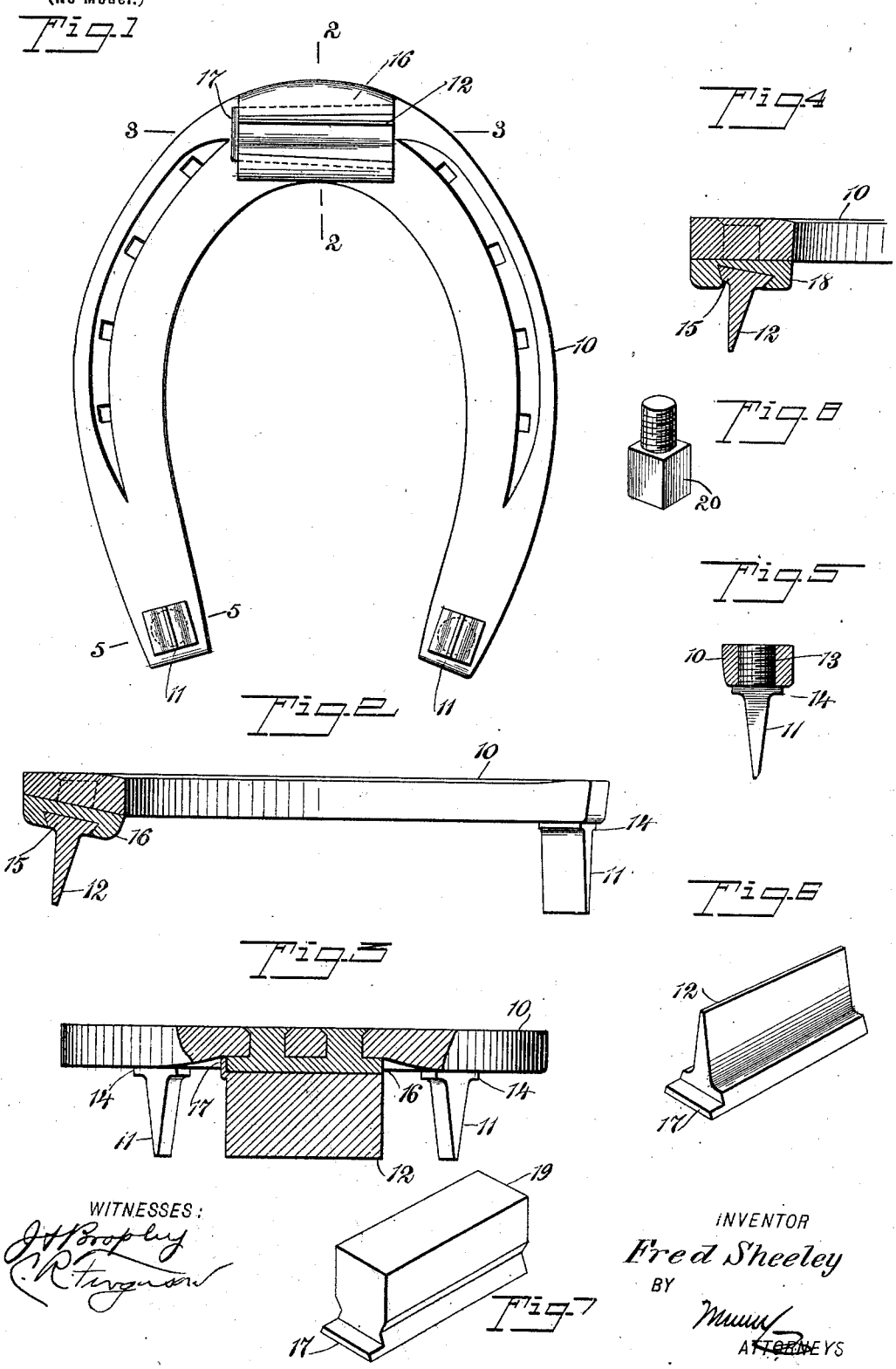

FRED SHEELEY, OF FLEISCHMANNS, NEW YORK.

HORSESHOE.

SPECIFICATION forming part of Letters Patent No. 707,454, dated August 19, 1902.

Application filed December 27, 1901. Serial No. 87,414. (No model.)

*To all whom it may concern:*

Be it known that I, FRED SHEELEY, a citizen of the United States, and a resident of Fleischmanns, in the county of Delaware and State of New York, have invented new and useful Improvements in Horseshoes, of which the following is a full, clear, and exact description.

This invention relates to improvements in horseshoes; and the object is to provide a horseshoe with calks that may be easily and quickly attached or removed, so that sharp calks may be used for winter weather to prevent the horse from slipping on ice, frozen ground, or the like and flat-faced calks be applied for summer use.

I will describe a horseshoe embodying my invention and then point out the novel features in the appended claims.

Reference is to be had to the accompanying drawings, forming a part of this specification, in which similar characters of reference indicate corresponding parts in all the figures.

Figure 1 is a bottom plan view of a horseshoe embodying my invention. Fig. 2 is a section on the line 2 2 of Fig. 1. Fig. 3 is a section on the line 3 3 of Fig. 1. Fig. 4 is a section showing one embodiment of toe-calk attachments. Fig. 5 is a section on the line 5 5 of Fig. 1, and Figs. 6, 7, and 8 are perspective views of different forms of calks.

Referring to the drawings, 10 designates a horseshoe substantially in the usual form. The heel-calks are indicated at 11 and the toe-calks at 12. Each heel-calk 11 is wedge-shaped and flattened on its opposite sides, and as a means for removably connecting the heel-calk to the shoe I provide the calk with a threaded shank 13 for engaging a thread in an opening formed in the shoe. Between the shank 13 and the calk shoulders 14 are formed to engage against the surface of the shoe, so as to brace the calk and prevent possible breaking at the shank portion. These calks may be turned transversely of the shoe or they may be arranged lengthwise thereof, as indicated by Fig. 1. The toe-calk 12 is also wedge-shaped, but it is much longer than the heel-calks. This toe-calk 12 is provided with a base 15, the opposite edges of which are beveled and designed to engage with the undercut side walls of a slot formed in a block 16, secured to the shoe by rivets or otherwise.

The base 15 is longitudinally tapered, as is also the slot, so that the toe-calk may be slid in from one end of the block 16, and when inserted the lip 17 on the smaller end of the base may be turned to engage against the end of the block, thus preventing an outward movement of the calk.

It is designed that the toe-calk shall stand at an incline relative to the plane of the shoe, so that when the horse lifts his foot, the heel portion being naturally first lifted, the calk will stand practically in a vertical line, so that it may be readily withdrawn from the ground. Some shoes are transversely beveled or inclined on their lower sides, as indicated in Fig. 2, and therefore by securing the block 16 to its surface the toe-calk will have the desired incline. In other instances, however, shoes are made flat or on a horizontal plane on their lower surfaces. In such instances the base-walls of the slots through the block 18, as indicated in Fig. 4, should be inclined relatively to the shoe. In Fig. 7 the toe-calk 19 is flat or smooth, and this calk may be used in warm weather or when there is no danger of the horse slipping, and the heel-calk 20 in Fig. 8 is also smooth.

Having thus described my invention, I claim as new and desire to secure by Letters Patent—

1. In a horseshoe, a block secured to the toe portion of the shoe, and having a slot, the opposite side walls of this slot being undercut, a toe-calk, a base on said toe-calk having its edges designed to engage with said undercut walls, and a lip on one end of the base adapted to be turned against the block.

2. In a horseshoe, a block on the toe portion of said horseshoe, and having a channel or groove, the opposite side walls of which are undercut and converged at one end, a wedge-shaped toe-calk, a base on said calk having beveled edges for engaging with said walls of the channel, and a lip on one end of the base adapted to be turned against the end of the block.

In testimony whereof I have signed my name to this specification in the presence of two subscribing witnesses.

FRED SHEELEY.

Witnesses:
VIRGIL B. VAN WAGONER,
MABEL S. SNYDER.